United States Patent [19]
Gidley

[11] Patent Number: 5,204,172
[45] Date of Patent: Apr. 20, 1993

[54] FLEXIBLE FABRIC THERMAL INSULATORS

[75] Inventor: Roy J. Gidley, Lancaster, United Kingdom

[73] Assignee: Courtaulds plc, United Kingdom

[21] Appl. No.: 743,400

[22] PCT Filed: Feb. 16, 1990

[86] PCT No.: PCT/GB90/00262
§ 371 Date: Aug. 16, 1991
§ 102(e) Date: Aug. 16, 1991

[87] PCT Pub. No.: WO90/09281
PCT Pub. Date: Aug. 23, 1990

[30] Foreign Application Priority Data
Feb. 17, 1989 [GB] United Kingdom ............... 8903641

[51] Int. Cl.$^5$ ............... B32B 17/02; B32B 5/22; B27N 9/50

[52] U.S. Cl. ............... 428/251; 428/253; 428/285; 428/286; 428/920

[58] Field of Search ............... 428/228, 246, 251, 253, 428/284, 285, 286, 429, 432, 920, 298

[56] References Cited

U.S. PATENT DOCUMENTS 4,777,086 10/1988 Madden et al. ............... 428/920
4,865,907 9/1989 Julis et al. ............... 428/920
4,948,660 8/1990 Rias et al. ............... 428/920

Primary Examiner—George F. Lesmes
Assistant Examiner—Kathryne Shelborne
Attorney, Agent, or Firm—Davis Hoxie Faithfull & Hapgood

[57] ABSTRACT

A laminated fabric suitable as a thermal insulator or fire barrier. The fabric comprises a layer (10) of a knitted glass fabric, to provide flexibility, and layers of heat reflecting materials (11), to reflect the heat, and woven glass fabric (12) to provide an effective thermal barrier.

10 Claims, 1 Drawing Sheet

FLEXIBLE FABRIC THERMAL INSULATORS

TECHNICAL FIELD

This invention relates to flexible laminated fabrics which are suitable for use as fire barriers and thermal insulation materials.

British Standard BS 476 part 20 lays down certain standards which fire barriers have to meet to be acceptable. In certain cases there is a requirement that the barrier should retain its insulation performance for at least 30 minutes. Whilst in some cases products can be designed to meet this specification by making them thicker or more bulky there are applications where the increased weight per unit area, thickness and/or bulk are unacceptable. There is therefore a need for a lightweight flexible fabric barrier which will conform with the fire resistance standards but which is of reduced thickness and/or weight per unit area compared to prior art barriers and the present invention seeks to meet this need.

SUMMARY OF THE INVENTION

According to the present invention, a laminated fabric comprises a first layer of knitted glass fabric, a second layer of heat reflecting foil, a third layer comprising a woven glass fabric and a fourth layer comprising an abrasion resistant material.

Suitably the first layer is a weft knitted fabric, and the second layer is selected from the group comprising aluminium foil and stainless steel foil. Desirably the first layer is clad on each surface with a second, a third and a fourth layer.

The invention provides a flexible fabric which is lightweight, very flexible, and can be made quite thin and still meet the above-mentioned British Standard specification.

BRIEF DESCRIPTION OF DRAWING

An embodiment of the present invention will now be described, by way of an example, with reference to the accompanying drawing, in which.

DESCRIPTION OF PREFERRED EMBODIMENT

Figure 1:
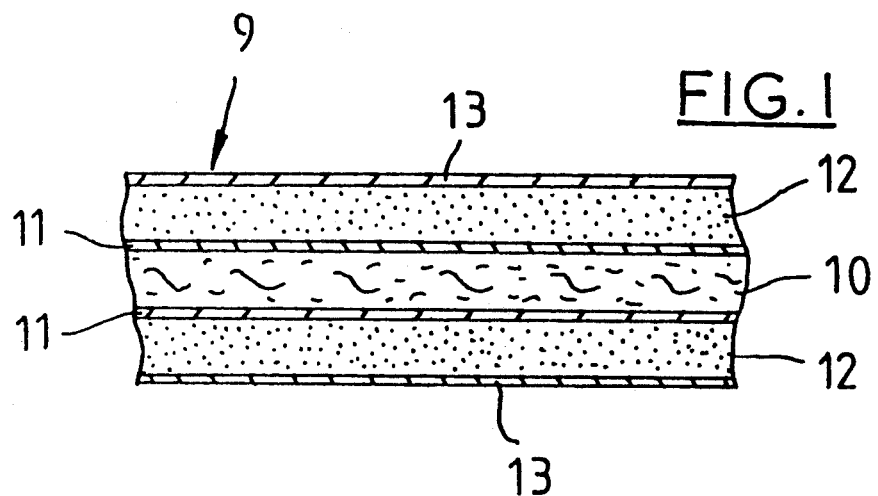
FIG. 1 shows, schematically, a cross-section through a flexible fire barrier constructed in accordance with the present invention.

Referring to FIG. 1 of the drawing, a barrier 9 comprises a layer of weft knitted texturised glass fabric 10. This fabric is knitted from electrical grade glass filaments of approximately $6\mu$ diameter to give a layer of approximately 8 mm thick.

Preferably, but not necessarily, the fabric 10 is leached in hydrochloric acid to remove impurities and thus improve its temperature resistance.

A heat reflective layer 11, for example an aluminium foil, about $15\mu$ thick is located adjacent each surface of the fabric 10. The aluminium layers 11 are not bonded to the fabric 10. Each aluminium layer 11 is preferably bonded, using a neoprene or a silicone adhesive, to an outer layer of woven glass fabric 12. It is not absolutely necessary to bond the aluminium to the outer layer 12 at this stage of manufacture. The fabric layer 12 is a plain weave using electrical grade glass filaments of about $9\mu$ diameter. The outermost surface of each fabric layer 12 is coated with a thin skin of silicone rubber 13 to provide abrasion resistance. The total thickness of the barrier shown in the drawing is about 12 mm, although various thicknesses can be produced using different diameters of glass filaments.

Various modifications can be made without departing from the invention. For example although the aluminium heat reflective layers 11 are shown in the drawing between the knitted fabric layer 10 and each woven fabric layer 12, the aluminium layers 11 could be provided on the outside surface of the woven layer 12. In this case, the silicone rubber 13 would be applied to the aluminium layers 11, and the aluminium layers 11 would be bonded to the surface of the woven layers 12. The silicone rubber could be omitted, in which case the glass fabric would be subjected to a vermiculite treatment.

In yet a further modification, a thicker barrier could be made by adding one or more layers of knitted glass fabrics similar to the layer 10. In this modification, heat reflective layers of aluminium could be located between knitted glass layers, although it may also be possible to do without heat reflective layers between the knitted glass layers and to use heat reflective layers applied to outer woven layers similar to those shown as 12 in the drawing.

Figure 2:
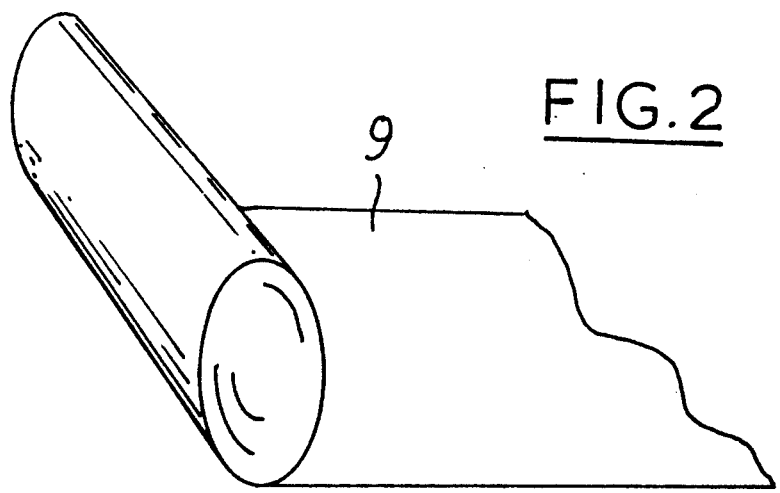
FIG. 2 shows a length of barrier material of the type shown in FIG. 1, as a partly rolled-up blanket.

An important feature of a barrier 9 according to this invention is its flexibility without loss of its thermal insulation capabilities. A barrier when made in accordance with the embodiment shown in FIG. 1 is flexible enough to be rolled onto itself (as shown in FIG. 2) for storage and deployed as a fire barrier by unrolling it. Furthermore the barrier constructed in accordance with the embodiment illustrated also shows good potential as a thermal insulator for use in the building trade, for example in cavity wall thermal insulation and may provide acoustic insulation as well.

Flexibility is imparted to the laminated barrier 9 by the use of knitted glass fabric which in itself is also an effective thermal barrier. In addition, the woven glass fabric, although not quite so flexible as a knitted fabric provides a good thermal screen. The aluminium further enhances the heat reflective ability of the barrier.

Other heat reflective materials could be used in place of aluminium for example stainless steel foil could be used.

I claim:

1. A flexible laminated fabric comprising a first layer (10) of knitted glass fabric, a second layer (11) of heat reflecting foil, a third layer (12) comprising a woven glass fabric and a fourth layer (13) comprising an abrasion resistant material.

2. A fabric according to claim 1, wherein the first layer (10) is a weft knitted fabric.

3. A fabric according to claim 1, wherein the second layer (11) is selected from the group comprising aluminium foil and stainless steel foil.

4. A fabric according to claim 1, wherein the first layer (10) is clad on each surface with a second (11), a third (12) and a fourth (13) layer.

5. A fabric according to claim 1, wherein there are two or more first layers (10).

6. A fabric according to claim 5, wherein there are two or more second layers (11).

7. A fabric according to claim 6, wherein a second layer (11) is interposed between the first layers (10).

8. A fabric according to claim 1, wherein the fourth layer (13) is resilient.

9. A fabric according to claim 8, wherein the fourth layer (13) is a silicone rubber.

10. A flexible fire-resistant barrier (9) formed from a rolled-up length of laminated fabric as claimed in claim 1.